United States Patent
Ohlsson et al.

(10) Patent No.: US 11,968,535 B2
(45) Date of Patent: Apr. 23, 2024

(54) METHODS, UE AND ACCESS NODE FOR HANDLING SYSTEM INFORMATION SIGNATURES

(71) Applicant: Telefonaktiebolaget LM Ericsson (publ), Stockholm (SE)

(72) Inventors: Oscar Ohlsson, Bromma (SE); Prajwol Kumar Nakarmi, Sollentuna (SE); Icaro Leonardo Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 57 days.

(21) Appl. No.: 17/619,031

(22) PCT Filed: May 26, 2020

(86) PCT No.: PCT/SE2020/050531
§ 371 (c)(1),
(2) Date: Dec. 14, 2021

(87) PCT Pub. No.: WO2020/256617
PCT Pub. Date: Dec. 24, 2020

(65) Prior Publication Data
US 2022/0303775 A1 Sep. 22, 2022

Related U.S. Application Data

(60) Provisional application No. 62/862,160, filed on Jun. 17, 2019.

(51) Int. Cl.
*H04W 12/108* (2021.01)
*H04W 12/122* (2021.01)
*H04W 48/12* (2009.01)

(52) U.S. Cl.
CPC ....... *H04W 12/108* (2021.01); *H04W 12/122* (2021.01); *H04W 48/12* (2013.01)

(58) Field of Classification Search
CPC .. H04W 12/108; H04W 12/122; H04W 48/12
See application file for complete search history.

(56) References Cited

U.S. PATENT DOCUMENTS

| 10,349,280 B2* | 7/2019 | Manepalli ............. H04W 48/02 |
| 2013/0019298 A1* | 1/2013 | Jover Segura ...... H04L 63/1466 726/7 |

(Continued)

FOREIGN PATENT DOCUMENTS

WO 2019059925 A1 3/2019

OTHER PUBLICATIONS

Chouchane et al., "Defending against Rogue Base Station Attacks using Wavelet Based Fingerprinting", May 2009, IEEE/ACS International Conference on Computer Systems and Applications, pp. 523-530 (Year: 2009).*

(Continued)

*Primary Examiner* — Kenneth W Chang
(74) *Attorney, Agent, or Firm* — Murphy, Bilak & Homiller, PLLC

(57) ABSTRACT

The present disclosure relate to a method performed by a UE (102) for handling an invalid SI signature in a communication system. The UE obtains SI and an associated SI signature for a cell. The UE (102) determines if the obtained SI signature is valid or invalid. If the signature is valid, the UE (102) determines to use the cell. If the SI signature is invalid, the UE (102) determines if the UE (102) is configured to bar cells or not. If the SI signature is invalid and if the UE (102) is not configured to bar cells with invalid SI signature, the UE (102) determines to use the cell. If the SI signature is invalid and the UE (102) is configured to bar cells with invalid SI signature, the UE (102) determines to bar the cell and select another cell to use.

11 Claims, 10 Drawing Sheets

(56) References Cited

U.S. PATENT DOCUMENTS

| | | |
|---|---|---|
| 2013/0045706 A1 | 2/2013 | Hsu |
| 2013/0244718 A1 | 9/2013 | Lee et al. |
| 2015/0195774 A1* | 7/2015 | Lee .................. H04W 48/12 370/312 |
| 2016/0262068 A1* | 9/2016 | Won .................. H04W 36/0011 |
| 2016/0381545 A1* | 12/2016 | Wang .................. H04W 12/128 455/434 |
| 2017/0295489 A1 | 10/2017 | Agiwal et al. |
| 2017/0311165 A1 | 10/2017 | Kang et al. |
| 2018/0124697 A1* | 5/2018 | Nair .................. H04W 12/122 |
| 2018/0367303 A1 | 12/2018 | Velev et al. |
| 2018/0367998 A1 | 12/2018 | Kunz et al. |
| 2019/0373474 A1 | 12/2019 | Moisanen et al. |
| 2020/0145821 A1* | 5/2020 | Lee .................. H04W 12/037 |
| 2020/0162925 A1 | 5/2020 | Miao et al. |
| 2021/0204129 A1* | 7/2021 | Yang .................. H04W 76/27 |

OTHER PUBLICATIONS

"3rd Generation Partnership Project; Technical Specification Group Services and System Aspects; Study on the security aspects of the next generation system (Release 14)", 3GPP Draft; S3-172095_TR33899, XP05133612, Aug. 2017, 605 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.5.0, Mar. 2019, 363 pages.

3GPP, "3GPP TR 33.899 V1.3.0", 3rd Generation Partnership Project; Technical Specification Group Services and System Aspects; Study on the security aspects of the next generation system (Release 14), Aug. 2017, 1-605.

3GPP, "3GPP TS 38.300 V15.5.0", 3rd Generation Partnership Project; Technical Specification Group Radio Access Network; NR; NR and NG-RAN Overall Description; Stage 2 (Release 15), Mar. 2019, 1-97.

Ericsson, "Support of fake gNB detection mechanisms", 3GPP TSG-RAN WG2 #99, Tdoc R2-1707802, (resubmission of R2-1706322), Berlin, Germany, Aug. 21-25, 2017, 1-4.

ZTE Corporation, "Anti fake base station based on symmetric algorithm", 3GPP TSG SA WG3 (Security) Meeting #94, S3-190155, (revision of S3-19xabc), Kochi (India), Jan. 28- Feb. 1, 2019, 1-7.

* cited by examiner

METHODS, UE AND ACCESS NODE FOR HANDLING SYSTEM INFORMATION SIGNATURES

TECHNICAL FIELD

Embodiments herein relate generally to a User Equipment, UE, a method performed by the UE, an access node and a method performed by the access node. The embodiments herein relate to handling System Information (SI) signatures.

The embodiments herein relate to enabling UE recovery at SI signature verification failure.

BACKGROUND

Wireless Communication Systems in Third Generation Partnership Project (3GPP)

Consider an example of a communication system as illustrated in FIG. 1, with a UE 102, which communicates with one or multiple access nodes 103, 104, which in turn is connected to a network node 106. The access nodes 103, 104 are part of the access network 100. The access network 100 may be a radio access network. The communication system exemplified in FIG. 1 may be a wireless communication system, a wired communication system or a combined wired and wireless communication system. The network node 106 may also be referred to as a Core Network (CN) node.

For communication systems pursuant to 3GPP Evolved Packet System (EPS), also referred to as Long Term Evolution (LTE) or Fourth Generation (4G), standard specifications, such as specified in 3GPP TS 36.300 and related specifications, the access nodes 103, 104 corresponds typically to an Evolved NodeB (eNB) and the network node 106 corresponds typically to either a Mobility Management Entity (MME) and/or a Serving Gateway (SGW). The eNB is part of the access network 100, which in this case is the Evolved Universal Terrestrial Radio Access Network (E-UTRAN), while the MME and SGW are both part of the Evolved Packet Core network (EPC). The eNBs are inter-connected via the X2 interface, and connected to EPC via the S1 interface, more specifically via S1-C to the MME and S1-U to the SGW.

For communication systems pursuant to 3GPP Fifth Generation (5G) System (5GS), also referred to as New Radio (NR), or 5G, standard specifications, such as specified in 3GPP TS 38.300 and related specifications, on the other hand, the access nodes 103, 104 corresponds typically to an 5G NodeB (gNB) and the network node 106 corresponds typically to either a Access and Mobility Management Function (AMF) and/or a User Plane Function (UPF). The gNB is part of the access network 100, which in this case is the Next Generation Radio Access Network (NG-RAN), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs can also be connected to the 5GC via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

System Information in NR

System Information (SI) is information that is repeatedly broadcast by the network, e.g. the access node 103, 104 and which needs to be acquired by UEs 102 in order for them to be able to access and, in general, operate properly within the network and within a specific cell.

In NR, SI is delivered using two different mechanisms relying on two different transport channels:
  A limited amount of SI, corresponding to the so-called Master-Information Block (MIB), is transmitted using the Broadcast Channel (BCH).
  The main part of the SI, corresponding to different so-called System-Information Blocks (SIBs), is transmitted using the Downlink Shared Channel (DL-SCH).

The MIB comprises the most essential SI parameters needed to bootstrap the UE 102 and to obtain the rest of the SI. Unlike the SIBs, the MIB has a fixed size and the only way to add new information is use to one of the spare bits in MIB that have been reserved for future use.

The first SIB, SIB1, comprises the SI that the UE 102 needs to know before it can access the system. SIB1 is always periodically broadcast over the entire cell area. An important task of SIB1 is to provide the information the UE 102 needs to carry out initial random access. SIB1 also comprises scheduling information for the remaining SIBs. MIB and SIB1 together forms what is known as the Minimum SI.

The remaining SIBs, not including SIB1, is known as the Other SI, and comprises the SI that the UE 102 does not need to know before accessing the system. These SIBs can also be periodically broadcast similar to SIB1. Alternatively, these SIBs can be transmitted on demand, that is, only transmitted when explicitly requested by the UE 102. This implies that the network can avoid periodic broadcast of these SIBs in cells which no UE 102 uses, e.g. is connected to, has selected, is currently camping on etc., thereby allowing for enhanced network energy performance. Currently, at least the following SIBs are defined:
  SIB2 comprises cell re-selection information, mainly related to the serving cell;
  SIB3 comprises information about the serving frequency and intra-frequency neighbouring cells relevant for cell re-selection, including cell re-selection parameters common for a frequency as well as cell specific re-selection parameters;
  SIB4 comprises information about other NR frequencies and inter-frequency neighbouring cells relevant for cell re-selection, including cell re-selection parameters common for a frequency as well as cell specific re-selection parameters;
  SIB5 comprises information about Evolved-Universal Terrestrial Radio Access (E-UTRA) frequencies and E-UTRA neighbouring cells relevant for cell re-selection, including cell re-selection parameters common for a frequency as well as cell specific re-selection parameters;
  SIB6 comprises an ETWS primary notification;
  SIB7 comprises an ETWS secondary notification;
  SIB8 comprises a CMAS warning notification;
  SIB9 comprises information related to GPS time and Coordinated Universal Time (UTC).

Three types of Radio Resource Control (RRC) message listed above are used to transfer SI: the MIB message, the SIB1 message and SI messages. An SI message, of which there may be several, comprises one or more SIBs which have the same scheduling requirements, i.e. the same transmission periodicity. The mapping of SIBs into SI messages, as well as the scheduling information for those SI messages, are defined in SIB1.

Signed SI in NR

Today in NR, SI is transmitted without integrity protection which means that an attacker may attempt to manipulate the SI without the UE 102 being able to detect it. As a result, UE 102 may use that manipulated SI and be tricked to camp on a rogue cell leading to Denial of Service (DoS), e.g. if the UE 102 tries to access a cell generated by a fake access node. The UE 102 may also end up reporting false/incorrect information about neighbor cells to the genuine network which in turn could impact various Self Organizing Networks (SON) functions. For example, the UE 102 may send a measurement report with a Physical Cell Identifier (PCI) associated to a cell generated by a fake access node that is unknown to the source node. That source node may then request the UE 102 to report the Cell Global Identifier (CGI) so that it can establish a neighbour relation. However, that would not work as that is a cell generated by a fake access node. To mitigate this type of attacks one solution is to digitally sign the SI using public key cryptography.

Selective Deployment of Signed SI

One general problem with signed SI is that only a subset of the operators may choose to deploy such a solution, and the ones that do might only do so in a limited part of their network. It is also possible that only parts of the SI are signed. For example, to avoid having to re-generate the signature all the time, SIBs that are updated often, e.g. SIB9 which comprises time information, can be excluded from the signature generation. There are existing methods for how an operator can inform the UE 102 in a secure way whether a network uses signed SI or not and which parts of the SI that are covered by the signature.

Supporting large signatures using late detection

Ideally the signature should be comprised already in Minimum SI, i.e. MIB or SIB1, since this is the first SI that the UE 102 acquires and it is also the only SI that is required to access the system.

Since the size of the signature is large it can be difficult to fit it into the Minimum SI. Using MIB is ruled out since MIB has fixed size and the free space that is available is very limited. Also the size of SIB1 is limited in practice as cell edge UEs 102 need to be able to decode it within the SI transmission window. The exact size limit depends on factors such as transmission power, cell size and frequency band etc., but is typically around 1000 bits. Since SIB1 also comprises other information there may not be enough space left to fit the signature. SIB1 is also time critical and to reduce the acquisition time it should preferably be as small as possible.

One way to solve the size problem is to transmit the signature in a separate SIB. However, if the UE 102 is required to acquire the separate SIB and verify the signature before it can start using the information in the Minimum SI there is a risk of increased delays. For example, cell search could take a very long time if the UE 102 is required to verify the signature in every cell that it discovers. Another example is when the network re-directs the UE 102 to another cell and the UE 102 needs to quickly setup a connection. To solve this issue, a "late detection" approach involves that the UE 102 applies the Minimum SI as soon as it has been acquired and where the signature verification is done afterwards once the signature is acquired. The same approach can be used also for the other parts of SI that is covered by the signature.

Indicating Support of Signed SI

In order to configure the necessary parameters for signed SI e.g. public keys, the network must first know if the UE 102 supports signed SI, which may be referred to as performing a SI protection negotiation. An SI protection negotiation mechanism may involve that the UE 102 could signal its capabilities and where the network could configure the signature verification parameters. The SI protection negotiation can either be performed as part of an existing Non-Access Stratum (NAS) procedure, e.g. network registration, or it could be performed using a dedicated NAS procedure, see FIG. 2. The procedure shown in FIG. 2 comprises at least one of the following steps, which steps may be performed in any suitable order than described below:

Step 10

The UE 102 sends a NAS message to the Serving CN. The NAS message may comprise the SI capability.

Step 11

The Serving CN determines that, for an UE 102 that has proper SU capabilities, it shall send SI protection information to the UE 102.

Step 12

The Serving CN sends a NAS message to the UE 102. The NAS message comprises SI protection information. The NAS message may comprise at least one of: Tracking Area Identities (TAI), Physical Layer Cell Identities (PCI), Cell IDs, SI numbers, public keys etc.

One aspect of signed SI that has not yet been addressed is the signature verification failure handling. In particular, it is important that the UE 102 can recover from a SI signature verification failure so that it does not get stuck on a fake/rogue access node.

One aspect of signed SI that has not yet been addressed is the lack of understanding at the network side, e.g. the access node 103, 104, when that happens. In particular, it is important that the network is aware of a potential failure in the security mechanism to enable the feature and/or the potential presence of a fake access node 103, 104 pretending to be an access node 103, 104 and transmitting SI. Du to this lack of information and understanding, there could be for example, UEs 102 in the network camping on cells associated to the fake access node 103, 104, i.e. sort of a denial of service attack.

Therefore, there is a need to at least mitigate or solve this issue.

SUMMARY

An objective of embodiments herein is therefore to obviate at least one of the above disadvantages and to provide improved handling of SI signatures. The embodiments herein provide improved UE recovery at SI signature verification failure. The embodiments herein provide improved UE reporting of SI signature verification failure.

According to a first aspect, the object is achieved by a method performed by a UE for handling an invalid SI signature in a communication system. The UE obtains, from an access node, SI and an associated SI signature for a cell served by the access node and which the UE can use. The UE determines if the obtained SI signature is valid or invalid. If the signature is valid, then the UE determines to use the cell. If the SI signature is invalid, then the UE determines if the UE is configured to bar cells or not. If the SI signature is invalid and if the UE is not configured to bar cells with invalid SI signature, then the UE determines to use the cell. If the SI signature is invalid and the UE is configured to bar cells with invalid SI signature, then the UE determines to bar the cell and select another cell to use.

According to a second aspect, the object is achieved by a UE adapted for handling an invalid SI signature in a communication system. The UE is adapted to obtain, from an access node, SI and an associated SI signature for a cell served by the access node and which the UE can use. The UE is adapted to determine if the obtained SI signature is valid or invalid. The UE is adapted to, if the signature is valid, determine to use the cell. The UE is adapted to, if the SI signature is invalid, determine if the UE is configured to bar cells or not. The UE is adapted to, if the SI signature is invalid and if the UE is not configured to bar cells with invalid SI signature, determine to use the cell. The UE is adapted to, if the SI signature is invalid and the UE is configured to bar cells with invalid SI signature, determine to bar the cell and select another cell to use.

According to a third aspect, the object is achieved by a method performed by an access node for handling an invalid SI signature in a communication system. The access node provides one or multiple SI protection parameters to the UE.

According to a fourth aspect, the object is achieved by an access node adapted for handling an invalid SI signature in a communication system. The access node is adapted to provide one or multiple SI protection parameters to the UE. Embodiments herein afford many advantages, of which a non-exhaustive list of examples follows:

One advantage of the embodiments herein is that they allow the UE to recover from SI signature verification failure by temporarily barring the cell with invalid/signature and selecting another cell. By also allowing the network to disable barring and instead let the UE report the cells which failed SI signature verification, testing/troubleshooting can be simplified and prevents that UEs become unreachable when signed SI is deployed in a network. A cell may be considered barred if it is so indicated in the system information. A barred cell is a cell the UE is not allowed to use, e.g. connected to, to select, camp on etc.

One advantage of the embodiments herein is that they allows the network, e.g. the access node, to identify that UEs detected SI signature verification failure, which may either indicate a problem in the generation of signatures and/or the presence of fake base stations.

Thanks to the embodiments herein, the network, e.g. the access node, would become aware of a potential failure in the security mechanism to enable the feature of signed SI so that future failures could be avoided. In addition, network operator would also learn about the potential presence of a fake access node pretending to be a base station and transmitting SI. That could prevent UEs in the network to use, e.g. connected to, select, camp on etc., cells associated to fake access nodes, and thereby avoiding denial of service attacks.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
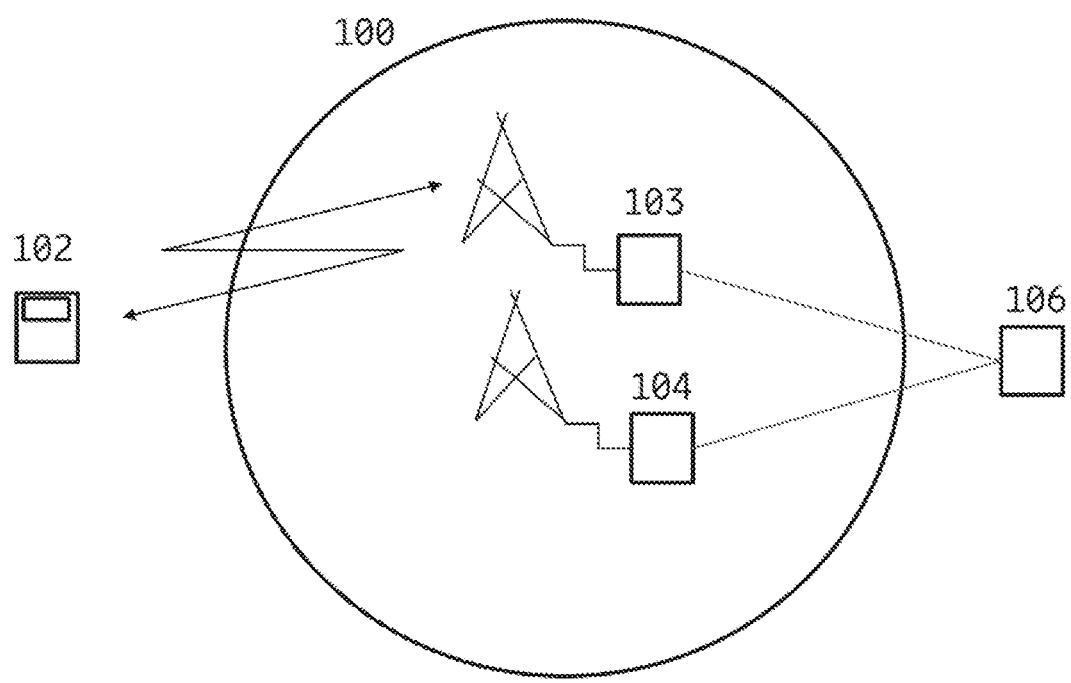
FIG. 1 schematic block diagram illustrating an example of a communication network or system.

The communication system exemplified in FIG. 1 will now be described in more detail. FIG. 1 depicts a non-limiting example of a communications system, which may be a wireless communications system, sometimes also referred to as a wireless communications network, cellular radio system, or cellular network, in which embodiments herein may be implemented. The communications system may be a 5G system, 5G network, NR-U or Next Gen system or network. The communications system may alternatively be a younger system than a 5G system. The communications system may support other technologies such as, for example, LTE, LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned systems.

The communications system comprises one or a plurality of access nodes, whereof a first access node 103 and a second access node 104 is depicted in the non-limiting example of FIG. 1. The term access node together with the reference numbers 103, 104 will be used herein when referring to any of the first access node 103 and the second access node 104. Note that only two access nodes 103, 104 are exemplified in FIG. 1 for the sake of simplicity, and that any n number of access nodes 103, 104 may be present in the communications system where n is a positive integer. The access node 103, 104 may be a radio network node, such as a radio base station, a radio access network node, an access network node or any other network node with similar features capable of serving a UE 102, such as a wireless device or a machine type communication device, in the communications system. The access node 103, 104 may be an eNB, gNB, Master eNB (MeNB), Radio Network Controller (RNC), NB, etc.

The communications system may cover a geographical area which may be divided into cell areas, wherein each cell area may be served by an access node 103, 104, although, one access node 103, 104 may serve one or several cells. Note that any n number of cells may be comprised in the communications system, where n is any positive integer. A cell is a geographical area where radio coverage is provided by the access node 103, 104 at an access node site. Each cell is identified by an identity within the local access node area, which is broadcast in the cell. In FIG. 1, the access node 103, 104 may serve a cell. The access node 103, 104 may be of different classes, such as, e.g., macro base station (BS), home BS or pico BS, based on transmission power and thereby also cell size. The access node 103, 104 may be a distributed node, such as a virtual node in the cloud, and it may perform its functions entirely on the cloud, or partially, in collaboration with another network node.

The access node 103, 104 may be directly or indirectly connected to one or more CNs, e.g. represented by a network node 106 in FIG. 1. Note that only one network node 106 is shown in FIG. 1 for the sake of simplicity, but any other suitable number of network nodes 106 may be located in the communications system. The network node 106 may be any suitable CN node such as e.g. a SGW, Packet Data Network Gateway (PGW), Gateway General Packet Radio Services (GPRS) Support Node (GGSN), Serving GPRS Support Node (SGSN), MME, AMF, UPF, Session Management Function (SMF), Home Location Register (HLR), Home Subscriber Server (HSS), Policy Control Function (PCF), Access Function (AF), Unified Data Management (UDM), Authentication Server Function (AUSF), Network Repository Function (NRF), Network Exposure Function (NEF), Network Slice Selection Function (NSSF), Charging Function (CHF) etc. The network node 106 may be referred to as a serving CN node, i.e. network node 106 which is currently serving the UE 102. The network node 106 may also referred to as a first CN node, or a home CN node.

One or a plurality of UEs 102 is located in the communication system. Only one UE 102 is exemplified in FIG. 1 for the sake of simplicity. A UE 102 may also be referred to simply as a device. The UE 102, e.g. a LTE UE or a 5G/NR UE, may be a wireless communication device which may also be known as e.g., a wireless device, a mobile terminal, wireless terminal and/or mobile station, a mobile telephone, cellular telephone, or laptop with wireless capability, just to mention some further examples. The UE 102 may be a device by which a subscriber may access services offered by an operator's network and services outside the operator's network to which the operator's access network and core network provide access, e.g. access to the Internet. The UE 102 may be any device, mobile or stationary, enabled to communicate over a radio channel in the communications system, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 102 may be portable, pocket storable, hand held, computer comprised, or vehicle mounted devices, enabled to communicate voice and/or data, via the access network 100, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in the communications system.

The UE 102 is enabled to communicate wirelessly within the communications system. The communication may be performed e.g. between two UEs, between a UE 102 and a regular telephone, between the UE 102 and an access node 103, 104, between network nodes 106, and/or between the UEs 102 and a server via the access network 100 and possibly one or more core networks and possibly the internet.

The access node 103, 104 may be configured to communicate in the communications system with the UE 102 over a communication link, e.g., a radio link.

It should be noted that the communication links in the communications system may be of any suitable kind comprising either a wired or wireless link. The link may use any suitable protocol depending on type and level of layer, e.g. as indicated by the Open Systems Interconnection (OSI) model, as understood by the person skilled in the art.

To enable the UE 102 to recover from an SI signature verification failure, cells with invalid signature can be handled in a similar way by the UE 102 as the UE 102 would handle the case when essential system information is missing. This means that the UE 102 considers the cell as barred and tries to select another cell. A barred cell may also be referred to as blocked, prohibited, invalid, not to be used, banned, excluded When selecting another cell after a SI signature verification failure, the UE 102 may consider either only inter-frequency cells or both intra- and inter-frequency cells. Since the originally selected cell, i.e. the barred cell, is typically the strongest cell on that frequency, selecting another intra-frequency cell will likely result in that the UE 102 ends up on a non-optimal cell. This may in turn result in worse link performance and increased inter-cell interference. For this reason, it may be desirable to restrict the cell selection to inter-frequency cells. Alternatively, the network can indicate to the UE 102 whether to consider intra-frequency cells or not.

An additional aspect to consider is the time that the cell/frequency layer should be barred. Barring the cell/frequency layer indefinitely is likely not a good option as that could in itself be exploited to launch a DoS attack. For this reason the barring timer would likely need to be limited to say a few seconds or minutes. Another option could be to have configurable barring timer which is signaled by the network to the UE 102. Yet another option would be to bar the cell until the next time the UE 102 is re-started. Of course, the downside of this approach is that the time between UE 102 re-starts may be very long.

For testing/troubleshooting purposes it may also be desirable if the network can disable barring. This may for example be useful if signed SI is being rolled out across a network and the operator wants to temporarily disable barring to prevent that UEs 102 become unreachable. This may be combined with a reporting mechanism to enable the UE 102 to report cells which failed SI signature verification to the network. Whether the UE 102 should bar cells that fail SI signature verification can for example be configured as part of the SI protection negotiation procedure. The same procedure can also be used to configure the intra-frequency allowed indication and barring time described above.

Figure 3:
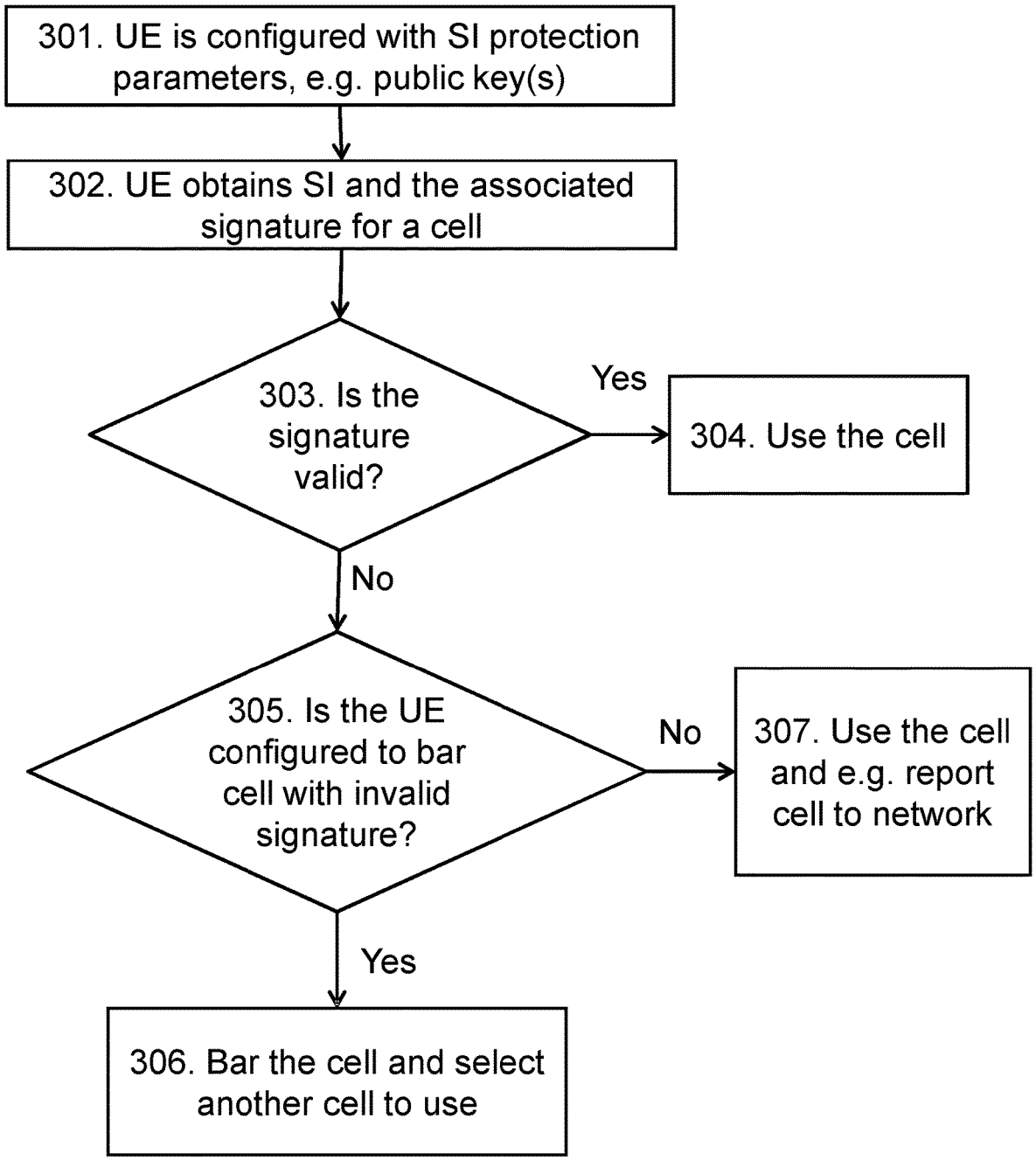
FIG. 3 is a flow chart illustrating an example of a method performed by the UE.

FIG. 3 is a flow chart illustrating an example of a method performed by the UE 102. The method performed by the UE 102 comprises at least one of the following steps, which steps may be performed in any suitable order than described below:

Step 301

Figure 2:
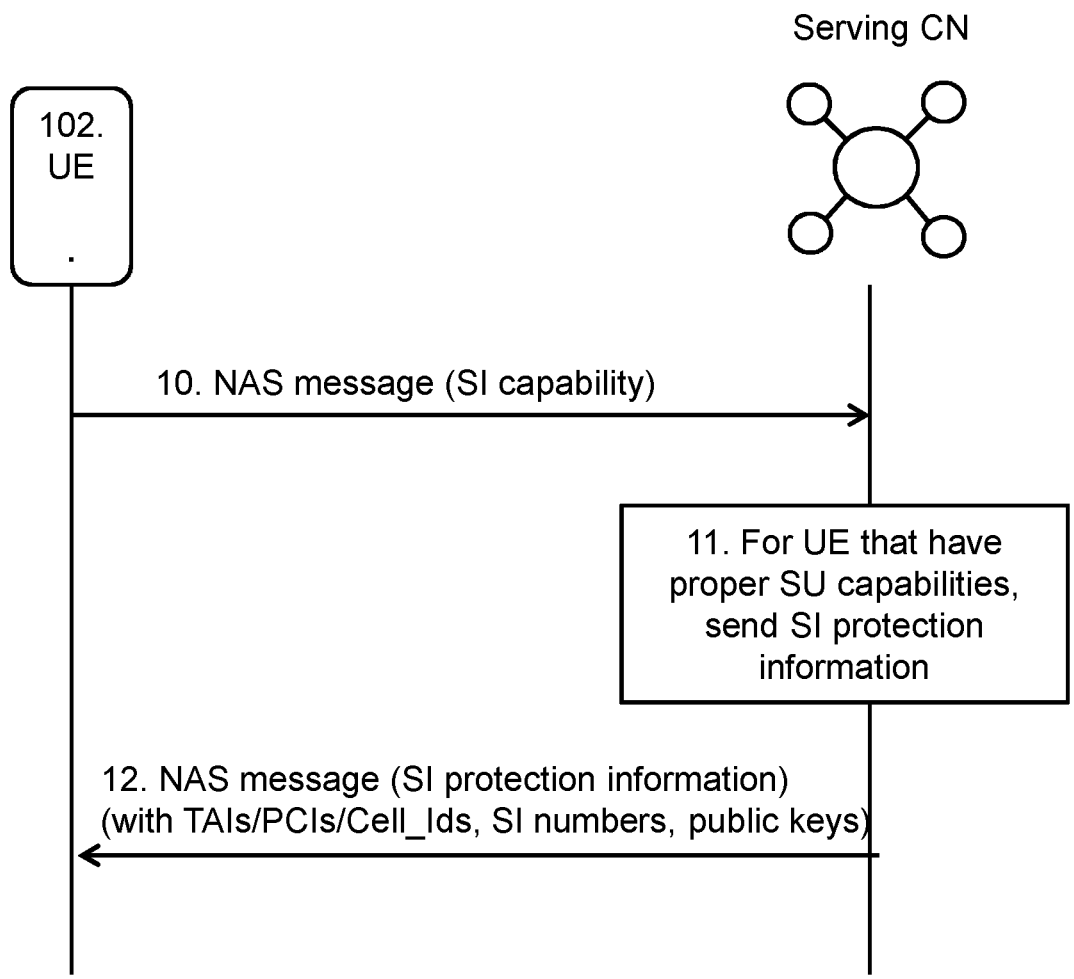
FIG. 2 is a signaling diagram illustrating an example of SI protection negotiation.

As part of the SI protection negotiation, the UE 102 may be configured with one or multiple SI protection parameters, including the public key for SI signature verification and potentially other parameters such as an intra-frequency cell selection allowed indication, a barring timer, and an indication whether cells with invalid signature should be barred or not. See FIG. 2 for an overview of the SI protection negotiation. If the public key and the other parameters are pre-configured or hardcoded into the standard this step 301 can be skipped. The UE 102 may be configured with one or multiple SI protection parameters by receiving them from the access node 103, 104, directly or indirectly via some other node or memory unit. The UE 102 may be configured with one or multiple SI protection parameters upon request or being pushed by the access node 103, 104. The UE 102 may be configured with one or multiple SI protection parameters by receiving information indicating another node or memory from which the UE 102 may obtain the one or multiple SI protection parameters.

Step 302

The UE 102 may obtain the SI and the associated signature in a cell. The signature may be referred to as SI signature. This step 302 may be performed when the UE 102 is in RRC_IDLE or RRC_INACTIVE state and searches for a suitable cell to use, e.g. connect to, select, camp on etc., in the cell selection/re-selection procedure. It may also be performed by a UE 102 in RRC_CONNECTED state when cell selection is triggered as part of the RRC connection re-establishment procedure or after a handover to a new cell when the UE 102 reads the SI of the target cell. The UE 102 may obtain the SI and the associated signature from the access node 103, 104.

Step 303

The UE 102 checks if the signature is valid or not. This may be done by that the UE 102 compares the signature from step 302 with a predetermined signature. The signature is valid if it matches the predetermined signature, and it is invalid if it does not match the predetermined signature.

Step 304

If the signature is valid, indicated with yes in FIG. 3, the UE 102 considers cell as valid and uses, e.g. connects to, selects, camps on etc., the cell.

Step 305

If the signature is invalid, indicated with no in FIG. 3, the UE 102 checks if the UE 102 is configured to bar cells with an invalid signature.

Step 306

If the signature is invalid and the UE 102 is configured to bar cells with invalid signature, indicated with yes in FIG. 3, the UE 102 considers the cell as barred and selects another cell to use, e.g. to connect to, to select, for camping on etc. Barring the cell may be the default action unless the UE 102 is explicitly instructed otherwise.

Furthermore, the time that the cell is considered barred and whether the UE 102 is allowed to select intra-frequency cells or only inter-frequency cells can either be pre-configured/hardcoded or it can be configured together with the public key during the SI protection negotiation. For the barring time, other alternatives could also be considered such as barring the cell until the next UE re-start or until the network, e.g. the access node 103, 104 or the network node 106, instructs the UE 102 to unbar all previously barred cells. If SI is protected using multiple signatures, e.g. one per SIB, the UE 102 could also perform different actions, e.g. apply different wait timer or perform different cell selection, depending on which part of system information that fails the signature verification.

Step 307

If the signature is invalid but the UE 102 is not configured to bar cells with invalid signature, indicated with no in FIG. 3, the UE 102 uses, e.g. connects to, selects, camps on etc., the cell but could e.g. later report the cell to the network, e.g. the access node 103, 104. Reporting the cell to the network may comprise sending a failure notification to the network, e.g. the access node 103, 104 or to the network node 106, e.g. a core network node. The node which receives the failure notification may be the same node which sent the SI to the UE 102 in step 302, or it may be a different node than the node which sent the SI to the UE 102, e.g. the network node 106 or another access node 103, 104.

Note that a signature may be considered invalid when the signature does not match the expected signature calculated using the public key. It also includes the case when the signature is missing or malformed. An invalid signature may sometimes be referred to as an integrity protection failure.

In case the UE 102 is in RRC_CONNECTED mode and SI verification failure is detected after a handover to a new cell, the UE 102 may also trigger RRC re-establishment and/or NAS recovery in addition to barring the cell.

Further Details

The embodiments herein relate to a method executed by a UE 102 to recover from verification failures for signed SI, the method comprising:

Considering a cell as barred upon acquisition of SI and detecting a verification failure, e.g. an integrity protection failure;

Selecting another cell on the same or a different frequency layer.

The detection of the verification failure could either be done by the RRC layer or by lower layer, i.e. the Physical (PHY) layer, the Medium Access Control (MAC) layer, the Radio Link Control (RLC) layer or the Packet Data Convergence Control (PDCP) layer. In the latter case, lower layers may provide an indication to the RRC layer that integrity protection of SI failed. That detection process may be done per system information block e.g. MIB or SIB-X.

The different actions performed by the UE 102 may depend on which state the UE 102 is in. For example, in the case the UE 102 is in RRC_IDLE or RRC_INACTIVE state, or any other power saving state, the UE 102 considers the cell as barred.

Below some are some examples of some possible embodiments. In the first example, upon detecting a verification failure of system information, the UE 102 performs actions as if MIB would be missing.

Essential SI Missing or Indication from Lower Layers of an Integrity Protection Failure from Lower Layers The UE 102 may:
1> if in RRC_IDLE or in RRC_INACTIVE or in RRC_CONNECTED while T311 is running:
  2> if the UE 102 is unable to acquire the MIB or;
  2> if the integrity protection check for SI fails:
    3> consider the cell as barred; and
    3> perform barring as if intraFreqReselection is set to allowed;
  2> else if the UE 102 is unable to acquire the SIB1:

3> consider the cell as barred.
        3> if intraFreqReselection in MIB is set to notAllowed:
            4> consider cell re-selection to other cells on the same frequency as the barred cell as not allowed.
        3> else:
            4> consider cell re-selection to other cells on the same frequency as the barred cell as allowed.

In a second example, upon detecting a verification failure of system information, the UE 102 performs actions as if SIB1 would be missing, as shown below:

Essential SI Missing or Indication from Lower Layers of an Integrity Protection Failure from Lower Layers The UE 102 may:
1> if in RRC_IDLE or in RRC_INACTIVE or in RRC_CONNECTED while T311 is running:
    2> if the UE 102 is unable to acquire the MIB:
        3> consider the cell as barred; and
        3> perform barring as if intraFreqReselection is set to allowed;
    2> else if the UE 102 is unable to acquire the SIB1 or;
    2> if the integrity protection check for SI fails:
        3> consider the cell as barred.
        3> if intraFreqReselection in MIB is set to notAllowed:
            4> consider cell re-selection to other cells on the same frequency as the barred cell as not allowed.
        3> else:
            4> consider cell re-selection to other cells on the same frequency as the barred cell as allowed.

In a third example, the verification and actions are done per specific SI. Hence, upon detecting a verification failure of MIB, the UE 102 performs actions as if MIB would be missing. And, upon detecting a verification failure of SIB1, the UE 102 may perform actions as if SIB1 would be missing, as shown below:

Essential SI Missing or Indication from Lower Layers of an Integrity Protection Failure from Lower Layers The UE 102 may:
1> if in RRC_IDLE or in RRC_INACTIVE or in RRC_CONNECTED while T311 is running:
    2> if the UE 102 is unable to acquire the MIB:
    2> if the integrity protection check for MIB fails:
        3> consider the cell as barred; and
        3> perform barring as if intraFreqReselection is set to allowed;
    2> else if the UE 102 is unable to acquire the SIB1 or;
    2> if the integrity protection check for SIB1 fails:
        3> consider the cell as barred.
        3> if intraFreqReselection in MIB is set to notAllowed:
            4> consider cell re-selection to other cells on the same frequency as the barred cell as not allowed.
        3> else:
            4> consider cell re-selection to other cells on the same frequency as the barred cell as allowed.

A UE 102 in RRC_CONNECTED may in addition trigger RRC connection re-establishment and/or NAS recovery. The example below shows how RRC connection re-establishment may be triggered upon detecting an SI integrity protection failure.

RRC Connection Re-Establishment
Initiation

The UE 102 may initiate the procedure when one of the following conditions is met:
1> upon detecting radio link failure of the MCG; or
1> upon re-configuration with sync failure of the MCG; or
1> upon mobility from NR failure; or
1> upon integrity check failure indication from lower layers concerning SRB1 or SRB2, except if the integrity check failure is detected on the RRCReestablishment message; or
1> upon an RRC connection reconfiguration failure.
1> upon detecting an SI integrity protection failure.

Upon initiation of the procedure, the UE 102 may:
1> stop timer T310, if running;
1> stop timer T304, if running;
1> start timer T311;
1> suspend all RBs, except SRB0;
1> reset MAC;
1> release the MCG SCell(s), if configured;
1> release spCellConfig;
1> release delayBudgetReportingConfig, if configured, and stop timer T342, if running;
1> release overheatingAssistanceConfig, if configured, and stop timer T345, if running;
1> perform cell selection in accordance with the cell selection process.

Figure 4:
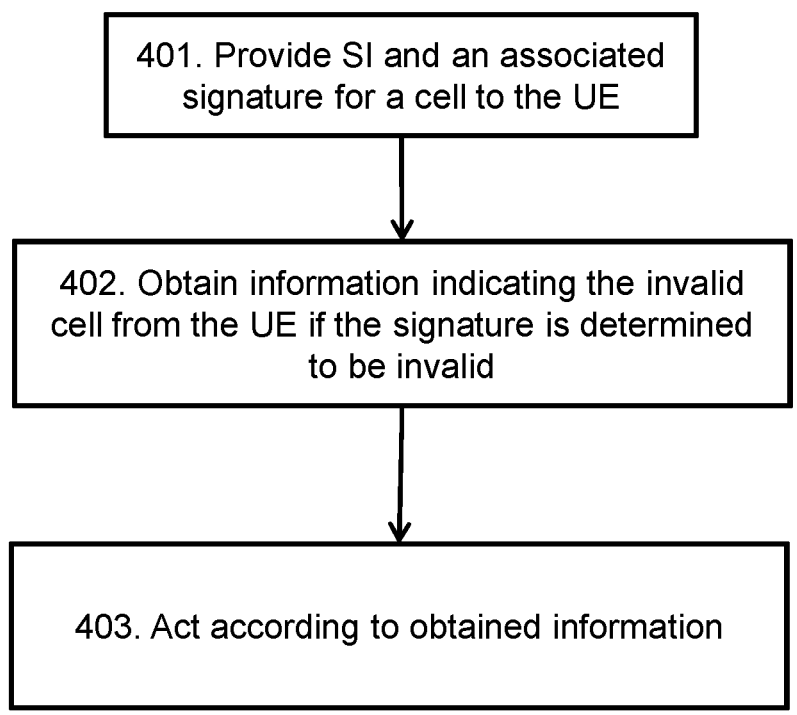
FIG. 4 is a flow chart illustrating an example of a method performed by the access node.

FIG. 4 is a flow chart illustrating a method performed by an access node 103, 104. The method comprises at least one of the following steps, which steps may be performed in any suitable order than described below:

Step 401

The access node 103, 104 may provide, to the UE 102 an indication of that it wants a failure report when the UE 102 has detected a failure. This step may also comprise that the access node 103, 104 provides one or multiple SI protection parameters to the UE 102, which may be obtained by the UE 102 as illustrated in step 301 in FIG. 3.

Step 402

The access node 103, 104 obtains information associated to the occurrence of a SI signature verification failure from the UE 102, possibly including associated information enabling the access node 103, 104 to take counter-measures e.g. location information of where the failure occurred, measurements around the time where the failure has occurred, etc.

Step 403

The access node 103, 104 acts according to the obtained information in step 402. Note that although the methods herein may, in some places, be described in the context of NR, the same methods may be applied to any access technologies that make use of SI like LTE or Narrowband-Internet of Things (NB-IoT).

Figure 5A:
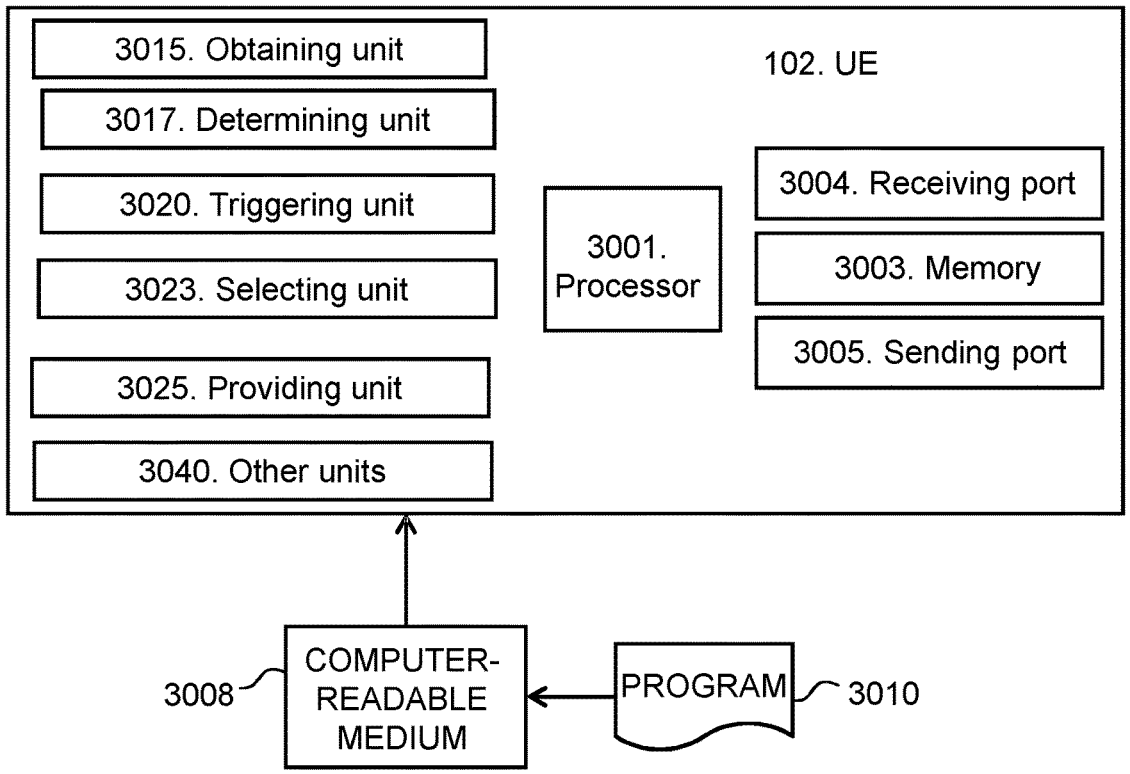
FIG. 5a-5b are schematic drawings illustrating an example of a UE.
Figure 5B:
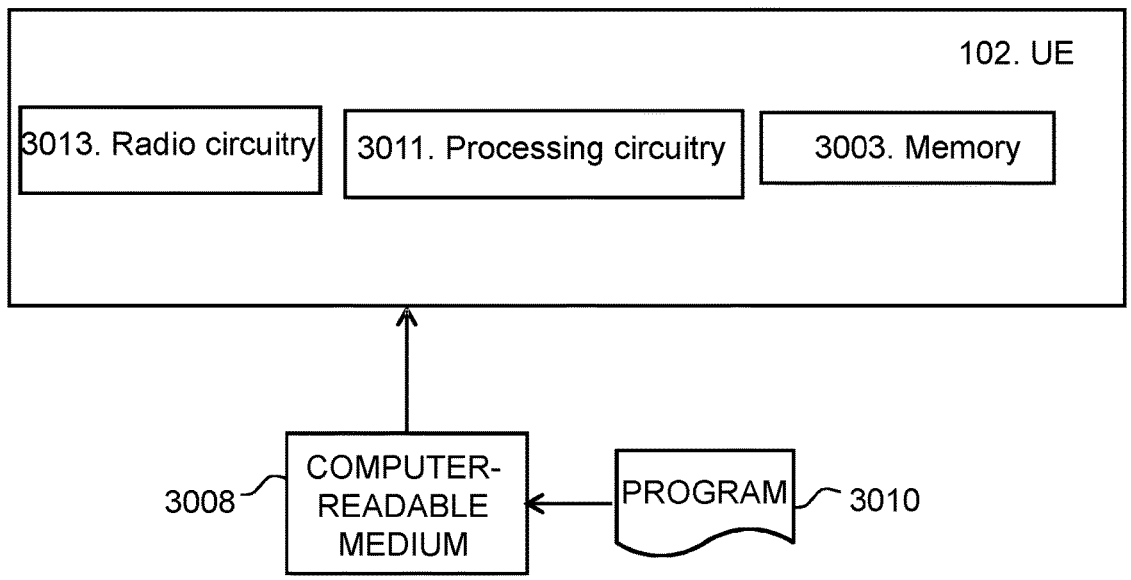

FIG. 5a and FIG. 5b depict two different examples in panels a) and b), respectively, of the arrangement that the UE 102 may comprise. In some embodiments, the UE 102 may comprise the following arrangement depicted in FIG. 5a.

The embodiments herein in the UE 102 may be implemented through one or more processors, such as a processor 3001 in the UE 102 depicted in FIG. 5a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 102. One such carrier may be in the form of a CD ROM disc. It is however feasible with other data carriers such as a memory stick. The computer program code may furthermore be provided as pure program code on a server and downloaded to the UE 102.

The UE 102 may further comprise a memory 3003 comprising one or more memory units. The memory 3003 is arranged to be used to store obtained information, store data, configurations, schedulings, and applications etc. to perform the methods herein when being executed in the UE 102.

In some embodiments, the UE 102 may receive information from, e.g., the access node 103, 104, through a receiving port 3004. In some embodiments, the receiving port 3004 may be, for example, connected to one or more antennas in UE 102. In other embodiments, the UE 102 may receive information from another structure in the communications system through the receiving port 3004. Since the receiving port 3004 may be in communication with the processor 3001, the receiving port 3004 may then send the received information to the processor 3001. The receiving port 3004 may also be configured to receive other information.

The processor 3001 in the UE 102 may be further configured to transmit or send information to e.g. access node 103, 104 or another structure in the communications network, through a sending port 3005, which may be in communication with the processor 3001 and the memory 3003.

The UE 102 may comprise an obtaining unit 3015, a determining unit 3017, a triggering unit 3020, a selecting unit 3023, a providing unit 3025 other units 3040.

Those skilled in the art will also appreciate that obtaining unit 3015, a determining unit 3017, a triggering unit 3020, a selecting unit 3023, a providing unit 3025 other units 3040 described above may refer to a combination of analog and digital circuits, and/or one or more processors configured with software and/or firmware, e.g. stored in memory, that, when executed by the one or more processors such as the processor 3001, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Also, in some embodiments, the different units 3015-3040 described above may be implemented as one or more applications running on one or more processors such as the processor 3001.

Thus, the methods according to the embodiments described herein for the UE 102 may be respectively implemented by means of a computer program 3010 product, comprising instructions, i.e. software code portions, which, when executed on at least one processor 3001, cause the at least one processor 3001 to carry out the actions described herein, as performed by the UE 102. The computer program 3010 product may be stored on a computer-readable storage medium 3008. The computer-readable storage medium 3008, having stored thereon the computer program 3010, may comprise instructions which, when executed on at least one processor 3001, cause the at least one processor 3001 to carry out the actions described herein, as performed by the UE 102. In some embodiments, the computer-readable storage medium 3008 may be a non-transitory computer-readable storage medium, such as a CD ROM disc, or a memory stick. In other embodiments, the computer program 3010 product may be stored on a carrier comprising the computer program 3010 just described, wherein the carrier is one of an electronic signal, optical signal, radio signal, or the computer-readable storage medium 508, as described above.

The UE 102 may comprise a communication interface configured to facilitate communications between the UE 102 and other nodes or devices, e.g., the access node 103, 104 or another structure. The interface may, for example, comprise a transceiver configured to transmit and receive radio signals over an air interface in accordance with a suitable standard.

In other embodiments, the UE 102 may comprise the following arrangement depicted in FIG. 5*b*. The UE 102 may comprise a processing circuitry 3011, e.g., one or more processors such as the processor 3001, in the UE 102 and the memory 3003. The UE 102 may also comprise a radio circuitry 3013, which may comprise e.g., the receiving port 3004 and the sending port 3005. The processing circuitry 3011 may be configured to, or operable to, perform the method actions according to FIG. 2-4, in a similar manner as that described in relation to FIG. 5*a*. The radio circuitry 3013 may be configured to set up and maintain at least a wireless connection with the UE 102. Circuitry may be understood herein as a hardware component.

Hence, embodiments herein also relate to the UE 102 operative to operate in the communications system. The UE 102 may comprise the processing circuitry 3011 and the memory 3003, said memory 3003 comprising instructions executable by the processing circuitry 3011, whereby the UE 102 is further operative to perform the actions described herein in relation to the UE 102, e.g., in FIG. 2-4.

Figure 6A:
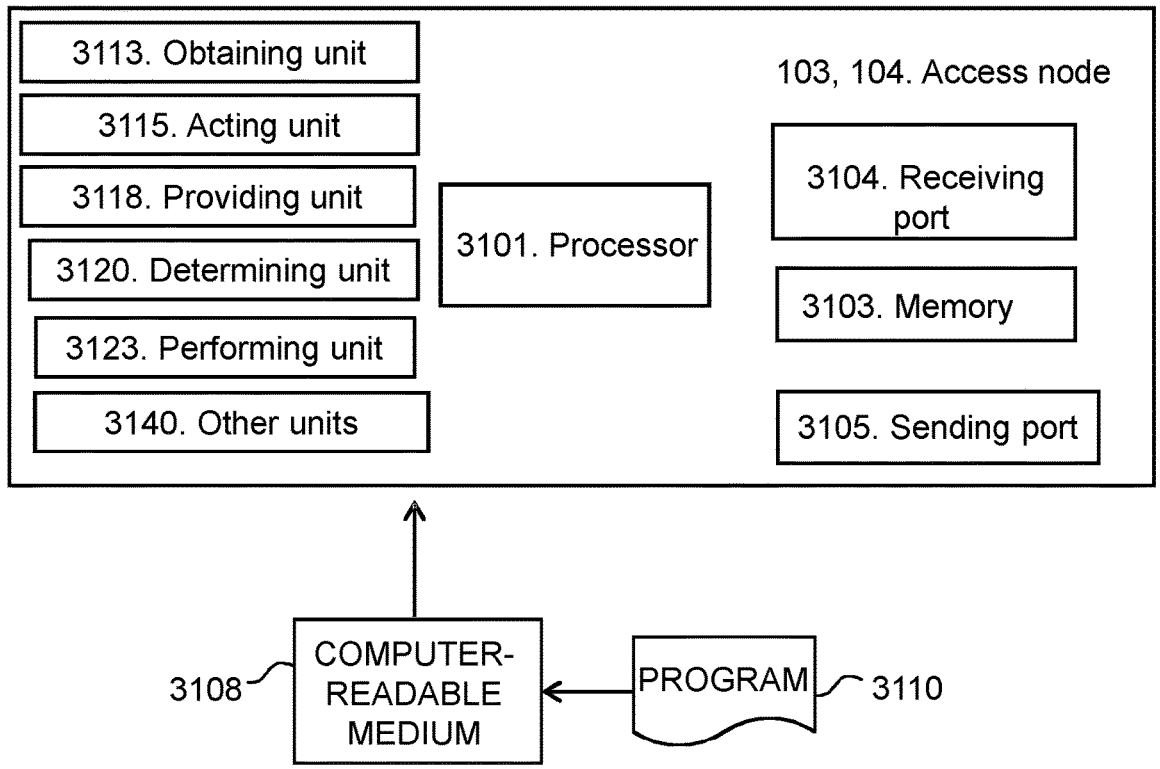
FIG. 6a-6b are schematic drawings illustrating an example of an access node.
Figure 6B:
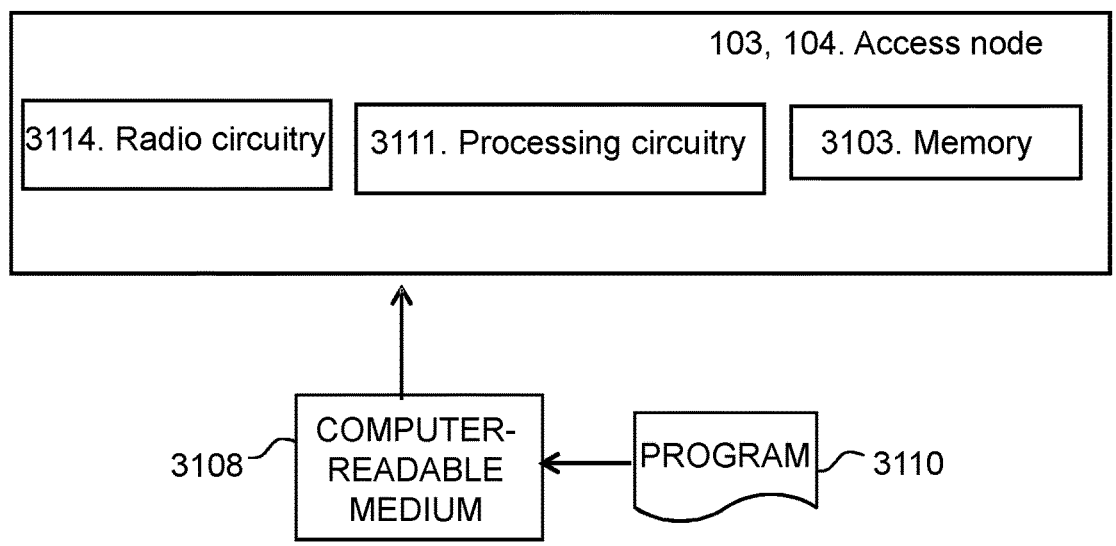

FIG. 6*a* and FIG. 6*b* depict two different examples in panels a) and b), respectively, of the arrangement that the access node 103, 104 may comprise. In some embodiments, the access node 103, 104 may comprise the following arrangement depicted in FIG. 6*a*.

The embodiments herein in the access node 103, 104 may be implemented through one or more processors, such as a processor 3101 in the access node 103, 104 depicted in FIG. 6*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the access node 103, 10. One such carrier may be in the form of a CD ROM disc. It is however feasible with other data carriers such as a memory stick. The computer program code may furthermore be provided as pure program code on a server and downloaded to the access node 103, 104.

The access node 103, 104 may further comprise a memory 3103 comprising one or more memory units. The memory 3103 is arranged to be used to store obtained information, store data, configurations, schedulings, and applications etc. to perform the methods herein when being executed in the access node 103, 104.

In some embodiments, the access node 103, 104 may receive information from, e.g. the UE 102 and/or another network node, through a receiving port 3104. In some embodiments, the receiving port 3104 may be, for example, connected to one or more antennas in access node 103, 104. In other embodiments, the access node 103, 104 may receive information from another structure in the communications system the receiving port 3104. Since the receiving port 3104 may be in communication with the processor 3101, the receiving port 3104 may then send the received information to the processor 3101. The receiving port 3104 may also be configured to receive other information.

The processor 3101 in the access node 103, 104 may be further configured to transmit or send information to e.g. the UE 102, or another structure in the communications system, through a sending port 3105, which may be in communication with the processor 3101 and the memory 3103.

The access node 103, 104 may comprise an obtaining unit 3113, an acting unit 3115, a providing unit 3118, a determining unit 3120, a performing unit 3123, other units 3140 etc.

The communications system may be a 2G network, a 3G network, a 4G network, a 5G network, a 6G network or any other legacy, current of future network.

The access node 103, 104 may be e.g. a base station, node B, eNB, gNB, RNC etc, or a network node 106 as exemplified above.

Those skilled in the art will also appreciate that the obtaining unit 3113, an acting unit 3115, a providing unit 3118, a determining unit 3120, a performing unit 3123, other units 3140 etc. described above may refer to a combination of analog and digital circuits, and/or one or more processors configured with software and/or firmware, e.g., stored in memory, that, when executed by the one or more processors such as the processor 3101, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Also, in some embodiments, the different units 3113-3140 described above may be implemented as one or more applications running on one or more processors such as the processor 3101.

Thus, the methods according to the embodiments described herein for the access node 103, 104 may be respectively implemented by means of a computer program 3110 product, comprising instructions, i.e., software code portions, which, when executed on at least one processor 3101, cause the at least one processor 3101 to carry out the actions described herein, as performed by the access node 103, 104. The computer program 3110 product may be stored on a computer-readable storage medium 3108. The computer-readable storage medium 3108, having stored thereon the computer program 3110, may comprise instructions which, when executed on at least one processor 3101, cause the at least one processor 3101 to carry out the actions described herein, as performed by the access node 103, 104. In some embodiments, the computer-readable storage medium 3110 may be a non-transitory computer-readable storage medium, such as a CD ROM disc, or a memory stick. In other embodiments, the computer program 3110 product may be stored on a carrier comprising the computer program 3110 just described, wherein the carrier is one of an electronic signal, optical signal, radio signal, or the computer-readable storage medium 3108, as described above.

The access node 103, 104 may comprise a communication interface configured to facilitate communications between the access node 103, 104 and other nodes or devices, e.g. the UE 102, or another structure. The interface may, for example, comprise a transceiver configured to transmit and receive radio signals over an air interface in accordance with a suitable standard.

In other embodiments, the access node 103, 104 may comprise the following arrangement depicted in FIG. 6b. The access node 103, 104 may comprise a processing circuitry 3111, e.g. one or more processors such as the processor 3101, in the access node 103, 104 and the memory 3103. The access node 103, 104 may also comprise a radio circuitry 3114, which may comprise e.g. the receiving port 3104 and the second sending port 3105. The processing circuitry 3111 may be configured to, or operable to, perform the method actions according to FIG. 2-4 in a similar manner as that described in relation to FIG. 6a. The radio circuitry 3114 may be configured to set up and maintain at least a wireless connection with the access node 103, 104. Circuitry may be understood herein as a hardware component.

Hence, embodiments herein also relate to the access node 103, 104 to operate in the communications system. The access node 103, 104 may comprise the processing circuitry 3111 and the memory 3103. The memory 3103 comprises instructions executable by said processing circuitry 3111, whereby the access node 103, 104 is further operative to perform the actions described herein in relation to the access node 103, 104, e.g., FIG. 2-4.

Further Extensions and Variations

Telecommunication network connected via an intermediate network to a host computer in accordance with some embodiments.

Figure 7:
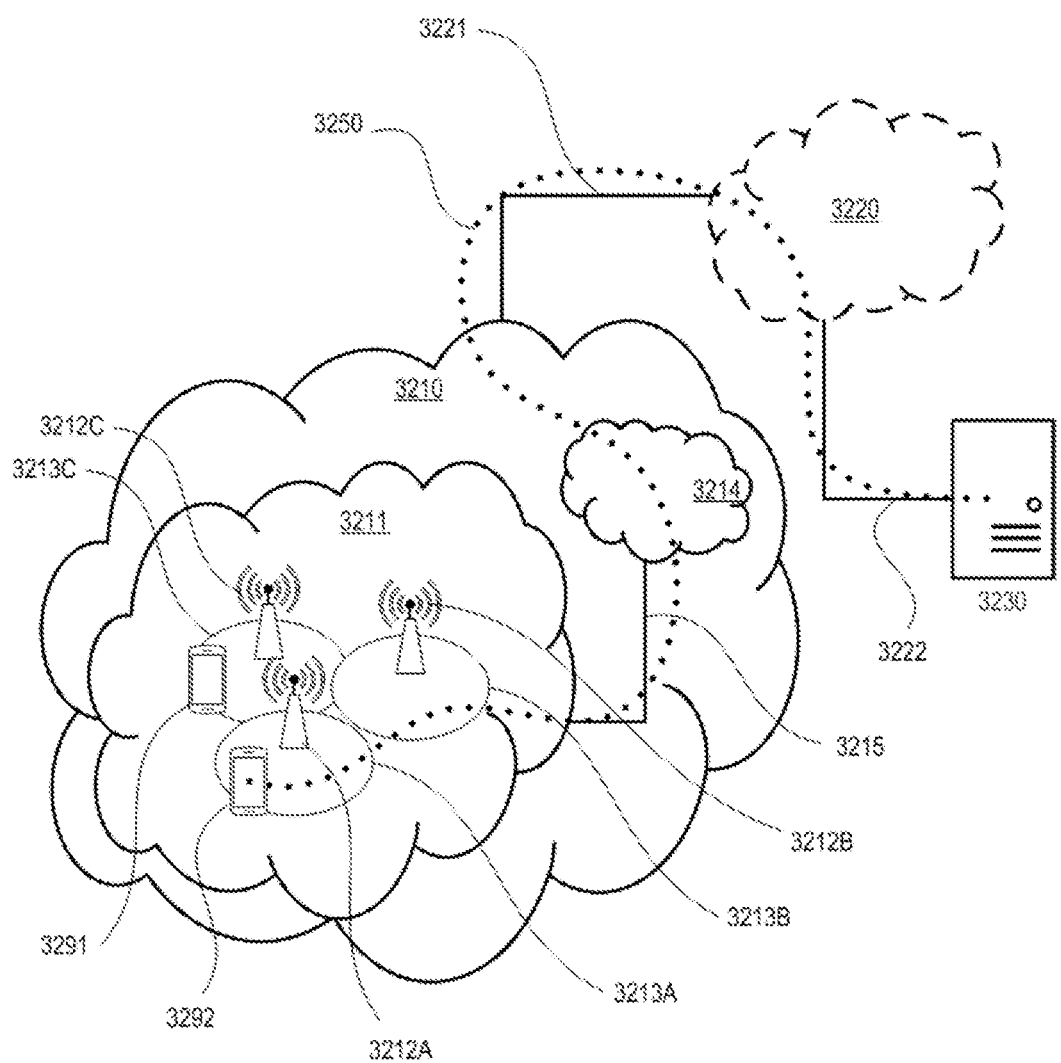
FIG. 7 is a schematic block diagram illustrating a telecommunication network connected via an intermediate network to a host computer.

With reference to FIG. 7, in accordance with an embodiment, a communication system comprises a telecommunication network 3210 such as the communications network, for example, a 3GPP-type cellular network, which comprises access network 3211, such as an access network, and core network 3214. Access network 3211 comprises a plurality of access nodes 103, 104. For example, access nodes 3212a, 3212b, 3212c, such as NBs, eNBs, gNBs or other types of wireless access points, each defining a corresponding coverage area 3213a, 3213b, 3213c. Each access node 3212a, 3212b, 3212c is connectable to core network 3214 over a wired or wireless connection 3215. A plurality of UEs, such as the UE 102 may be comprised in the communications system. In FIG. 7, a first UE 3291 located in coverage area 3213c is configured to wirelessly connect to, or be paged by, the corresponding access node 3212c. A second UE 3292 in coverage area 3213a is wirelessly connectable to the corresponding access node 3212a. While a plurality of UEs 3291, 3292 are illustrated in this example, the disclosed embodiments are equally applicable to a situation where a sole UE is in the coverage area or where a sole UE 102 is connecting to the corresponding access node 3212. Any of the UEs 3291, 3292 may be considered examples of the UE 102.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, access node 3212 may not or need not be informed about the past routing of an incoming downlink communication with data originating from host computer 3230 to be forwarded, e.g., handed over, to a connected UE 3291. Similarly, access node 3212 need not be aware of the future routing of an outgoing uplink communication originating from the UE 3291 towards the host computer 3230.

In relation to FIGS. 8-12 which are described next, it may be understood that the access node may be considered an example of the access node 103, 104.

Figure 8:
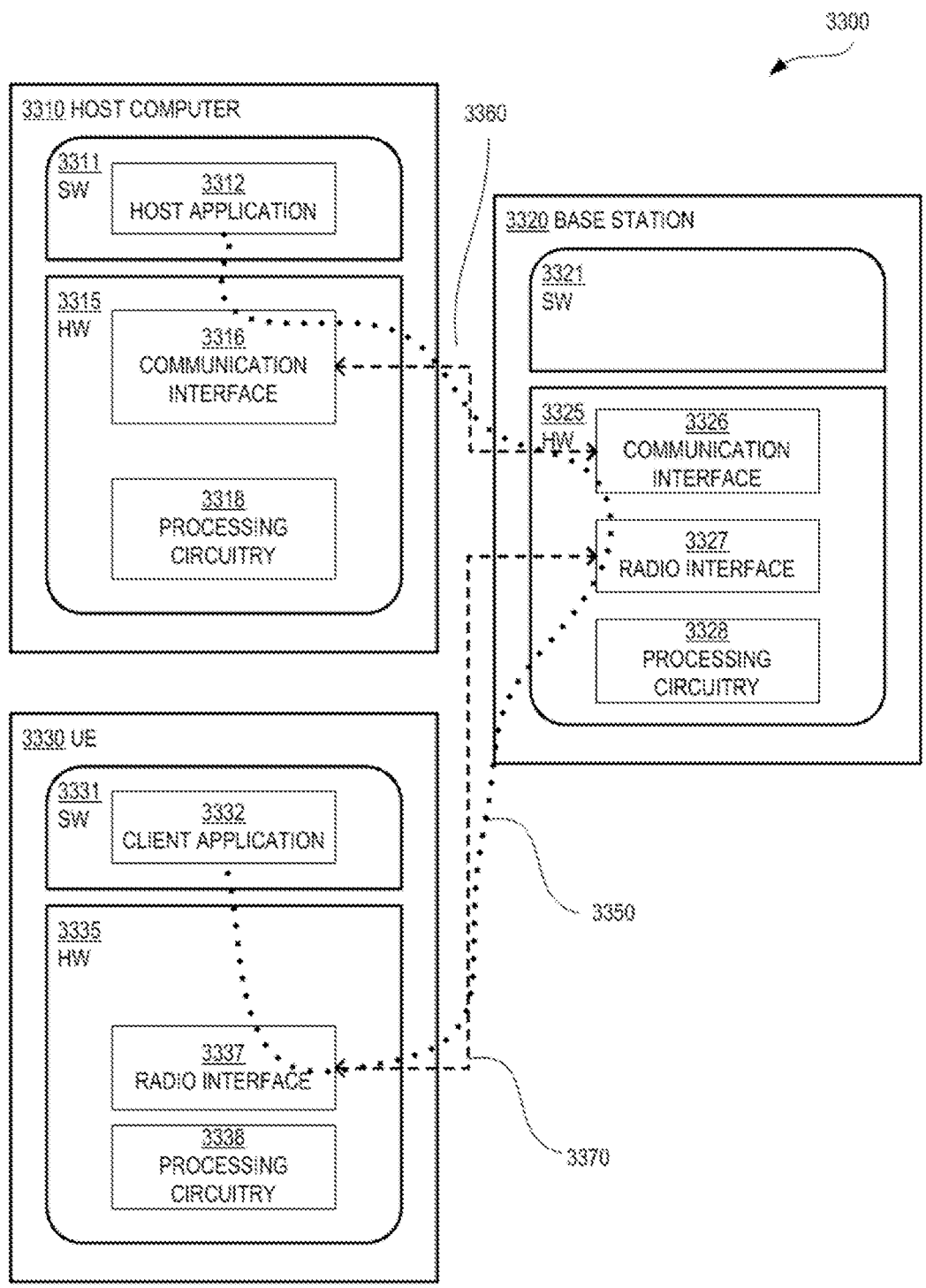
FIG. 8 is a schematic block diagram of a host computer communicating via an access node with a UE over a partially wireless connection.

FIG. 8 illustrates an example of host computer communicating via an access node 103, 104 with a UE 102 over a partially wireless connection in accordance with some embodiments The UE 102 and the access node 103, 104, e.g. an access node and host computer discussed in the preceding paragraphs will now be described with reference to FIG. 8. In communication system 3330, such as the communications network, host computer 3310 comprises hardware 3315 comprising communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, ASICs, field programmable gate arrays (FPGA) or combinations of these (not shown) adapted to execute instructions. Host computer 3310 further comprises software 3311, which is stored in or accessible by host computer 3310 and executable by processing circuitry 3318. Software 3311 comprises a host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further comprises the access node 103, 104 exemplified in FIG. 8 as an access node 3320 provided in a telecommunication system and comprising hardware 3325 enabling it to communicate with host computer 3310 and with UE 3330. Hardware 3325 may comprise a communication interface 3326 for setting up and maintaining a wired or wireless connection with an interface of a different communication device of communication system 3300, as well as radio interface 3327 for setting up and maintaining at least wireless connection 3370 with the UE 102, exemplified in FIG. 8 as a UE 3330 located in a coverage area (not shown in FIG. 8) served by access node 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of access node 3320 further comprises a processing circuitry 3328, which may comprise one or more programmable processors, ASICS, FPGAs or combinations of these (not shown) adapted to execute instructions. Access node 3320 further has software 3321 stored internally or accessible via an external connection.

Communication system 3300 further comprises a UE 3330 already referred to. It's hardware 3335 may comprise a radio interface 3337 configured to set up and maintain wireless connection 3370 with a access node serving a coverage area in which UE 3330 is currently located. Hardware 3335 of UE 3330 further comprises a processing circuitry 3338, which may comprise one or more programmable processors, ASICs, FPGAs or combinations of these (not shown) adapted to execute instructions. UE 3330 further comprises software 3331, which is stored in or accessible by UE 3330 and executable by processing circuitry 3338. Software 3331 comprises a client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, access node 3320 and UE 3330 illustrated in FIG. 8 may be similar or identical to host computer 3230, one of access nodes 3212a, 3212b, 3212c and one of UEs 3291, 3292 of FIG. 32, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via access node 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing, e.g. on the basis of load balancing consideration or reconfiguration of the network.

Wireless connection 3370 between UE 3330 and access node 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may comprise information indicating message format, retransmission settings, preferred routing etc.; the reconfiguring need not affect access node 3320, and it may be unknown or imperceptible to access node 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 9, 10:
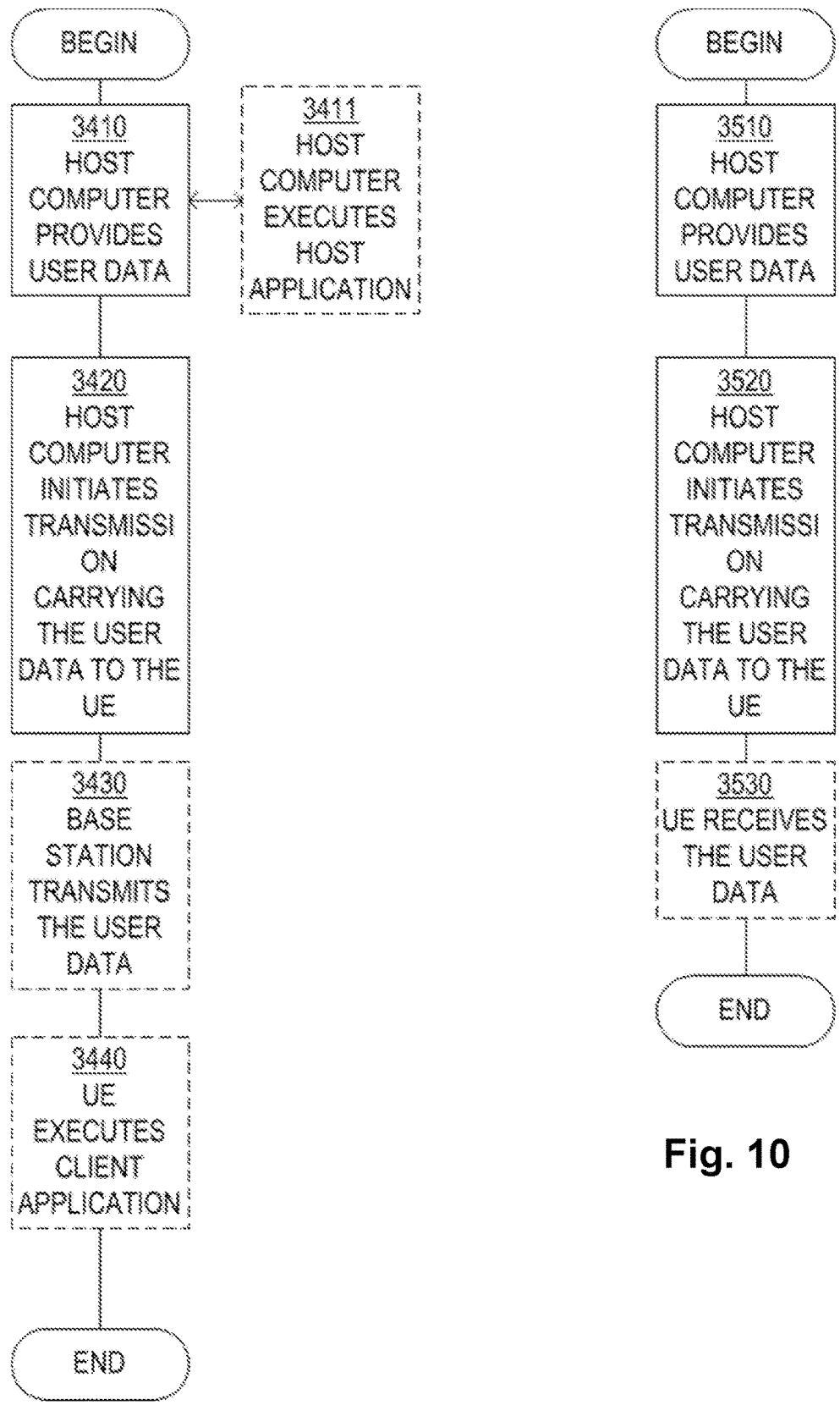
FIG. 9 is a flowchart depicting embodiments of a method in a communications system comprising a host computer, an access node and a UE.
FIG. 10 is a comprising depicting embodiments of a method in a communications system comprising a host computer, an access node and a UE.

FIG. 9 illustrates an example of methods implemented in a communication system comprising a host computer, an access node and a user equipment. FIG. 9 is a flowchart illustrating a method implemented in a communication system. The communication system comprises a host computer, an access node 103, 104 and an UE 102 which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the access node transmits to the UE 102 the user data which was carried in the transmission that the host computer initiated, in accordance with the teachings of the embodiments described throughout this disclosure. In step 3440 (which may also be optional), the UE 102 executes a client application associated with the host application executed by the host computer.

FIG. 10 illustrates methods implemented in a communication system comprising a host computer, an access node 103, 104 and an UE 102 in accordance with some embodiments. FIG. 10 is a flowchart illustrating a method implemented in a communication system. The communication system comprises a host computer, an access node 103, 104 and an UE 102 which may be those described with reference to FIG. 7 and FIG. 8. In step 3510 of the method, the host computer provides user data. In an optional substep (not shown) the host computer provides the user data by executing a host application. In step 3520, the host computer initiates a transmission carrying the user data to the UE 102. The transmission may pass via the access node, in accordance with the teachings of the embodiments described throughout this disclosure. In step 3530 (which may be optional), the UE 102 receives the user data carried in the transmission.

Figures 11, 12:
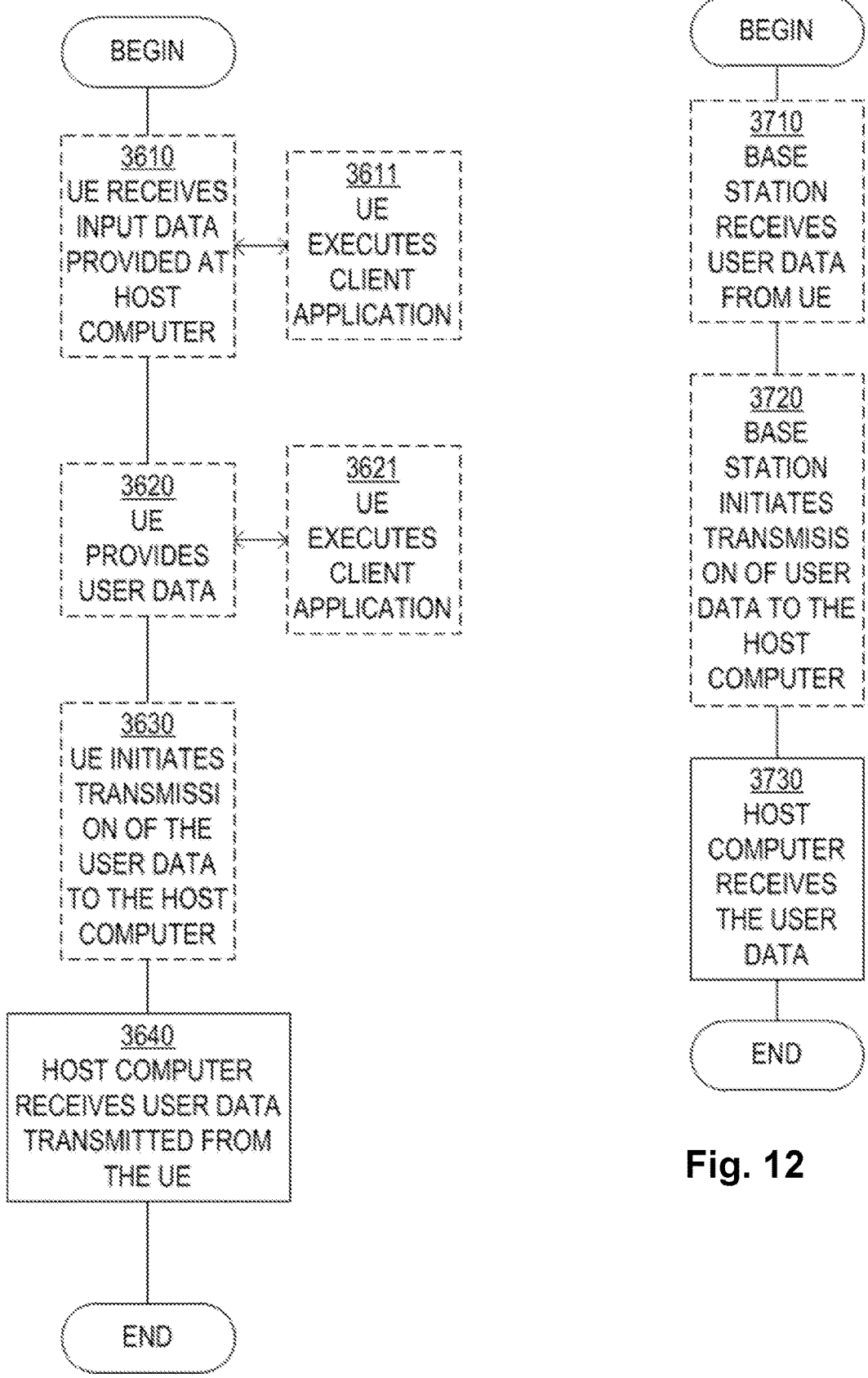
FIG. 11 is a flowchart depicting embodiments of a method in a communications system comprising a host computer, an access node and a UE.
FIG. 12 is a flowchart depicting embodiments of a method in a communications system comprising a host computer, an access node and a UE.

FIG. 11 illustrates methods implemented in a communication system comprising a host computer, an access node 103, 104 and a UE 102. FIG. 11 is a flowchart illustrating a method implemented in a communication system. The communication system comprises a host computer, an access node 103, 104 and a UE 102 which may be those described with reference to FIG. 7 and FIG. 8. For simplicity of the present disclosure, only drawing references to FIG. 11 will be included in this section. In step 3610 (which may be optional), the UE 102 receives input data provided by the host computer. Additionally or alternatively, in step 3620, the UE 102 provides user data. In substep 3621 (which may be optional) of step 3620, the UE 102 provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE 102 initiates, in substep 3630 (which may be optional), transmission of the user data to the host computer. In step 3640 of the method, the host computer receives the user data transmitted from the UE 102, in accordance with the teachings of the embodiments described throughout this disclosure.

FIG. 12 illustrates methods implemented in a communication system comprising a host computer, an access node 103, 104 and an UE 102. FIG. 12 is a flowchart illustrating a method implemented in a communication system. The communication system comprises a host computer, an access node 103, 104 and an UE 102 which may be those described with reference to FIG. 7 and FIG. 8. In step 3710 (which may be optional), in accordance with the teachings of the embodiments described throughout this disclosure, the access node 103, 104 receives user data from the UE 102. In step 3720 (which may be optional), the access node initiates transmission of the received user data to the host computer. In step 3730 (which may be optional), the host computer receives the user data carried in the transmission initiated by the access node.

Some embodiments may be summarized as follows:

A access node 103, 104 configured to communicate with a UE 102, the access node 103, 104 comprising a radio interface and processing circuitry configured to perform one or more of the actions described herein as performed by the access node 103, 104.

A communication system comprising a host computer comprising:

processing circuitry configured to provide user data; and
a communication interface configured to forward the user data to a cellular network for transmission to a UE 102,
wherein the cellular network comprises an access node 103, 104 having a radio interface and processing circuitry, the access node's processing circuitry configured to perform one or more of the actions described herein as performed by the access node 103, 104.

The communication system may further comprise the access node 103, 104.

The communication system may further comprise the UE 102, wherein the UE 102 is configured to communicate with the access node 103, 104.

The communication system, wherein:
the processing circuitry of the host computer is configured to execute a host application, thereby providing the user data; and
the UE 102 comprises processing circuitry configured to execute a client application associated with the host application.

A method implemented in an access node 103, 104, comprising one or more of the actions described herein as performed by the access node 103, 104.

A method implemented in a communication system comprising a host computer, an access node 103, 104 and a UE 102, the method comprising:
at the host computer, providing user data; and
at the host computer, initiating a transmission carrying the user data to the UE 102 via a cellular network comprising the access node 103, 104. The access node 103, 104 performs one or more of the actions described herein as performed by the access node 103, 104.

The method may further comprise:

at the access node 103, 104, transmitting the user data.

The user data may be provided at the host computer by executing a host application, and the method may further comprise:

at the UE 102, executing a client application associated with the host application.

A UE 102 configured to communicate with an access node 103, 104, the UE 102 comprising a radio interface and processing circuitry configured to perform one or more of the actions described herein as performed by the UE 102.

A communication system comprising a host computer comprising:

processing circuitry configured to provide user data; and a communication interface configured to forward user data to a cellular network for transmission to a UE 102, the UE 102 comprises a radio interface and processing circuitry, the UE's processing circuitry configured to perform one or more of the actions described herein as performed by the UE 102.

The communication system may further comprise the UE 102.

The communication system further comprising an access node 103, 104 configured to communicate with the UE 102.

The communication system, wherein:

the processing circuitry of the host computer is configured to execute a host application, thereby providing the user data; and the UE's processing circuitry is configured to execute a client application associated with the host application.

A method implemented in a UE 102, comprising one or more of the actions described herein as performed by the UE 102.

A method implemented in a communication system comprising a host computer, an access node 103, 104 and a UE 102, the method comprising:

at the host computer, providing user data; and at the host computer, initiating a transmission carrying the user data to the UE 102 via a cellular network comprising the access node, wherein the UE 102 performs one or more of the actions described herein as performed by the UE 102.

The method may further comprise:

at the UE 102, receiving the user data from the access node 103, 104.

A UE 102 configured to communicate with an access node 103, 104, the UE 102 comprising a radio interface and processing circuitry configured to perform one or more of the actions described herein as performed by the UE 102.

A communication system comprising a host computer comprising:

a communication interface configured to receive user data originating from a transmission from a UE 102 to an access node 103, 104, the UE 102 comprises a radio interface and processing circuitry, the UE's processing circuitry configured to perform one or more of the actions described herein as performed by the UE 102.

The communication system may further comprise the UE 102.

The communication system may further comprise the access node 103, 104, wherein the access node 103, 104 comprises a radio interface configured to communicate with the UE 102 and a communication interface configured to forward to the host computer the user data carried by a transmission from the UE 102 to the access node 103, 104.

The communication system, wherein:

the processing circuitry of the host computer is configured to execute a host application; and the UE's processing circuitry is configured to execute a client application associated with the host application, thereby providing the user data.

The communication system, wherein:

the processing circuitry of the host computer is configured to execute a host application, thereby providing request data; and the UE's processing circuitry is configured to execute a client application associated with the host application, thereby providing the user data in response to the request data.

A method implemented in a UE 102, comprising one or more of the actions described herein as performed by the UE 102.

The method may further comprise:

providing user data; and forwarding the user data to a host computer via the transmission to the access node 103, 104.

A method implemented in a communication system comprising a host computer, an access node 103, 104 and a UE 102, the method comprising:

at the host computer, receiving user data transmitted to the access node 103, 104 from the UE 102, wherein the UE 102 performs one or more of the actions described herein as performed by the UE 102.

The method may further comprise:

at the UE 102, providing the user data to the access node 103, 104.

The method may further comprise:

at the UE 102, executing a client application, thereby providing the user data to be transmitted; and at the host computer, executing a host application associated with the client application.

The method may further comprise:

at the UE 102, executing a client application; and at the UE 102, receiving input data to the client application, the input data being provided at the host computer by executing a host application associated with the client application, the user data to be transmitted is provided by the client application in response to the input data.

A access node 103, 104 configured to communicate with a UE 102, the access node 103, 104 comprising a radio interface and processing circuitry configured to perform one or more of the actions described herein as performed by the access node 103, 104.

A communication system comprising a host computer comprising a communication interface configured to receive user data originating from a transmission from a UE 102 to a access node 103, 104, wherein the access node 103, 104 comprises a radio interface and processing circuitry, the network node's processing circuitry configured to perform one or more of the actions described herein as performed by the access node 103, 104.

The communication system may further comprise the access node 103, 104.

The communication system may further comprise the UE 102. The UE 102 is configured to communicate with the access node 103, 104.

The communication system wherein:

the processing circuitry of the host computer is configured to execute a host application;

the UE 102 is configured to execute a client application associated with the host application, thereby providing the user data to be received by the host computer.

A method implemented in an access node 103, 104, comprising one or more of the actions described herein as performed by any of the access node 103, 104.

A method implemented in a communication system comprising a host computer, an access node 103, 104 and a UE 102, the method comprising:

at the host computer, receiving, from the access node 103, 104, user data originating from a transmission which the access node has received from the UE 102, wherein the UE 102 performs one or more of the actions described herein as performed by the UE 102.

The method may further comprise:

at the access node 103, 104, receiving the user data from the UE 102.

The method may further comprise:

at the access node 103, 104, initiating a transmission of the received user data to the host computer.

Some embodiments will be summarized below:

The communications system may be a 2G network, a 3G network, a 4G network, a 5G network, a 6G network or any other legacy, current of future network.

The access node 103, 104 may be a base station, node B, eNB, gNB, MeNB, RNC, access node, radio access node etc.

The embodiments herein relate to 5G, 4G, false access node, system information, broadcast message, digital signature etc.

The embodiments herein relate to UE recovery at SI signature verification failure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the embodiments herein, be performed in another order than the order in which they appear herein.

ABBREVIATIONS

3GPP 3rd Generation Partnership Project
5G 5th Generation
5GS 5G System
5GC 5G Core network
AMF Access and Mobility Management Function
CN Core Network
DL Downlink
eNB Evolved Node B
E-UTRAN Evolved Universal Terrestrial Access Network
EPC Evolved Packet Core network
gNB 5G Node B
LTE Long-term Evolution
MME Mobility Management Entity
NG The interface/reference point between the RAN and the CN in 5G/NR.
NG-C The control plane part of NG (between a gNB and an AMF).
NG-U The user plane part of NG (between a gNB and a UPF).
NG-RAN Next Generation Radio Access Network
NR New Radio
RAN Radio Access Network
RRC Radio Resource Control
Rx Receive
S1 The interface/reference point between the RAN and the CN in LTE.
S1-C The control plane part of S1 (between an eNB and a MME).
S1-U The user plane part of S1 (between an eNB and a SGW).
SGW Serving Gateway
TS Technical Specification
UE User Equipment
UL Uplink
UPF User Plane Function
X2 The interface/reference point between two eNBs.
X2AP X2 Application Protocol
Xn The interface/reference point between two gNBs.
XnAP Xn Application Protocol

The invention claimed is:

1. A method performed by a User Equipment (UE) for handling an invalid System Information (SI) signature in a communication system, the method comprising:

obtaining, from an access node, System Information (SI) and an associated SI signature for a cell served by the access node and which the UE can use;
determining whether the obtained SI signature is valid or invalid;
in response to determining that the SI signature is invalid:
determining whether to bar the cell based on a UE configuration indicating whether cells with invalid SI signatures should be barred and, if not, using the cell, or, if so, barring the cell and selecting another cell to use; and
triggering Radio Resource Control (RRC) re-establishment and/or Non-Access Stratum (NAS) recovery in addition to barring the cell, when the UE is in RRC_CONNECTED mode and the invalid SI signature is determined after a handover of the UE to a new cell.

2. The method according to claim 1, comprising obtaining one or multiple SI protection parameters.

3. The method according to claim 2, wherein the one or multiple SI protection parameters comprises at least one of: one or more public keys associated with determining if the SI signature is valid or invalid, an indication of allowed intra-frequency cell selection, a barring timer, and an indication of whether cells with invalid SI signature should be barred or not.

4. The method according to claim 1, wherein the SI and the associated SI signature for the cell is obtained under any one or more of the following circumstances:
when the UE is in Radio Resource Control_IDLE, RRC_IDLE, or RRC_INACTIVE state and searches for a suitable cell to use in a cell selection/re-selection procedure; or
when the UE is in RRC_CONNECTED state when cell selection is triggered as part of a RRC connection re-establishment procedure; or
after a handover to a target cell when the UE reads the SI for the target cell.

5. The method according to claim 1, wherein the UE bars the cell as a default action, unless the UE is explicitly instructed otherwise.

6. The method according to claim 1, wherein a time that the cell is considered barred and whether the UE is allowed to select intra-frequency cells or only inter-frequency cells is based on at least one of:
the UE being pre-configured or hardcoded; or
the UE being configured together with a public key during a SI protection negotiation; or
the cell being barred until a next UE re-start or until the access node or a network node instructs the UE to unbar all previously barred cells.

7. The method according to claim 1, wherein, responsive to the SI being protected using multiple SI signatures, the UE performs different actions depending on which part of SI fails an SI signature verification.

8. The method according to claim 1, wherein the SI signature is determined to be invalid responsive to at least one of: the SI signature not matching an expected or predetermined SI signature calculated using a public key; or the SI signature being missing or malformed.

9. The method according to claim 1, comprising determining that the cell is barred upon acquisition of SI and determining that the SI signature is invalid, and selecting another cell on the same or a different frequency layer as the barred cell.

10. A User Equipment (UE) comprising:
radio circuitry configured for communicating with access nodes of a communication system; and
processing circuitry operatively associated with the radio circuitry and configured to control the UE to:
obtain, from an access node of the communication system, System Information (SI) and an associated SI signature for a cell served by the access node and which the UE can use;
determine whether the obtained SI signature is valid or invalid;
in response to determining that the SI signature is invalid:
determine whether to bar the cell based on a UE configuration indicating whether cells with invalid SI signatures should be barred and, if not, use the cell, or, if so, bar the cell and select another cell to use; and
trigger Radio Resource Control (RRC) re-establishment and/or Non-Access Stratum (NAS) recovery in addition to barring the cell, when the UE is in RRC_CONNECTED mode and the invalid SI signature is determined after a handover of the UE to a new cell.

11. A non-transitory computer-readable medium storing computer program instructions that, when executed by one or more processors of a User Equipment (UE) configured for communicating with a communication system, configure the UE to:
obtain, from an access node of the communication system, System Information (SI) and an associated SI signature for a cell that is associated with the access node and which the UE can use;
determine whether the obtained SI signature is valid or invalid;
in response to determining that the SI signature is invalid:
determine whether to bar the cell based on a UE configuration indicating whether cells with invalid SI signatures should be barred and, if not, use the cell, or, if so, bar the cell and select another cell to use; and
trigger Radio Resource Control (RRC) re-establishment and/or Non-Access Stratum (NAS) recovery in addition to barring the cell, when the UE is in RRC_CONNECTED mode and the invalid SI signature is determined after a handover of the UE to a new cell.

* * * * *